United States Patent
Bellamkonda et al.

(10) Patent No.: US 12,416,995 B1
(45) Date of Patent: Sep. 16, 2025

(54) TRIGGERING MULTI-PHASE TRANSMISSION PATTERN SWITCHING TO REDUCE EMISSIONS IN TOUCH PRODUCTS

(71) Applicant: Cypress Semiconductor Corporation, San Jose, CA (US)

(72) Inventors: Revanth Bellamkonda, Cork (IE); Roman Ogirko, Lviv (UA); Daniel O'Keeffe, Cork (IE); Edward Gerard O'Malley, Claremorris (IE); Mehmet Vural, Ankara (TR)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

(21) Appl. No.: 18/890,402

(22) Filed: Sep. 19, 2024

(51) Int. Cl.
  *G06F 3/041* (2006.01)
  *G06F 3/044* (2006.01)

(52) U.S. Cl.
  CPC ........ *G06F 3/04166* (2019.05); *G06F 3/0418* (2013.01); *G06F 3/0446* (2019.05)

(58) Field of Classification Search
  CPC ... G06F 3/04166; G06F 3/0418; G06F 3/0446
  See application file for complete search history.

(56) References Cited

U.S. PATENT DOCUMENTS

| | | | | |
|---|---|---|---|---|
| 8,729,911 | B2* | 5/2014 | Maharyta | G06F 3/04166 324/690 |
| 11,320,946 | B2* | 5/2022 | Kremin | G06F 3/0446 |
| 2012/0268142 | A1* | 10/2012 | Kremin | G06F 3/0446 324/658 |
| 2016/0188105 | A1* | 6/2016 | Kremin | G06F 3/041 345/174 |

* cited by examiner

Primary Examiner — Michael Pervan

(57) ABSTRACT

An apparatus includes a sinusoidal wave generator that generates, over a first analog line, an in-phase drive signal and, over a second analog line, an opposite-phase drive signal. A comparator has inputs respectively coupled to the first analog line and the second analog line and asserts a first output in response to detecting a crossing between the in-phase drive signal and the opposite-phase drive signal. Multi-phase switching logic is coupled to an output of the comparator. The multi-phase switching logic asserts a second output in response to both detecting the first output and receiving a signal indicative of a phase switch of the sinusoidal wave generator. The second output controls timing of applying a multi-phase switching pattern to sets of switches coupled between the first analog line and the second analog line and transmission (TX) electrodes of a touch panel.

20 Claims, 9 Drawing Sheets

TRIGGERING MULTI-PHASE TRANSMISSION PATTERN SWITCHING TO REDUCE EMISSIONS IN TOUCH PRODUCTS

TECHNICAL FIELD

Embodiments of the present invention relate to the field of user interface devices and, in particular, to triggering multi-phase transmission pattern switching to reduce emissions in touch-sensing devices.

BACKGROUND

Computing devices, such as notebook computers, personal data assistants (PDAs), and mobile handsets, have user interface devices, which are also known as human interface devices (HID). One type of user interface device that has become more common is touch-sensing devices, such as touch-sensor pads (also commonly referred to as touchpads), touch-sensor sliders, touch-sensor buttons, touch-sensor keyboard, touchscreens, and touch panels.

A basic notebook touch-sensor pad emulates the function of a personal computer (PC) mouse. A touch-sensor pad is typically embedded into a PC notebook for built-in portability. A touch-sensor pad replicates mouse x/y movement by using two defined axes which contain a collection of sensor elements that detect the position of a conductive object, such as a finger. Mouse right/left button clicks can be replicated by two mechanical buttons, located in the vicinity of the touchpad, or by tapping commands on the touch-sensor pad itself. The touch-sensor pad provides a user interface device for performing such functions as positioning a pointer or selecting an item on a display.

Another user interface device that has become more common is a touch screen. Touch screens, also known as touchscreens, touch panels, or touchscreen panels are display overlays, which are typically pressure-sensitive (resistive), electrically sensitive (capacitive), acoustically sensitive (SAW—surface acoustic wave), or photo-sensitive (infra-red). The effect of such overlays allows a display to be used as an input device, removing the keyboard and/or the mouse as the primary input device for interacting with the display's content. Such displays can be attached to computers or, as terminals, to networks. There are several types of touch screen technology, such as optical imaging, resistive, surface wave, capacitive, infrared, dispersive signal, and strain gauge technologies. Touch screens have become familiar in retail settings, on point-of-sale systems, automatic teller machines, mobile handsets, game consoles, and personal digital assistants. A stylus is sometimes used to manipulate the graphical user interface (GUI) and to enter data.

In general, capacitance-sensing devices are intended to replace mechanical buttons, knobs, and other similar mechanical user-interface controls. Capacitance-sensing devices eliminate the complicated mechanical switches and buttons, providing reliable operation under harsh conditions. In addition, capacitance-sensing devices are widely used in modern customer applications, providing new user interface options in the existing products. Capacitive touch sensor elements can be arranged in the form of a sensor array for a touch-sensing surface. When a conductive object, such as a finger, comes in contact or close proximity with the touch-sensing surface, the capacitance of one or more capacitive touch sensor elements changes. An electrical circuit can measure the capacitance changes of the capacitive touch sensor elements. The electrical circuit, supporting one operation mode, converts the measured capacitances of the capacitive touch sensor elements into digital values.

There are two main operational modes in the capacitance-sensing circuits: self-capacitance sensing and mutual capacitance sensing. The self-capacitance sensing mode is also called single-electrode sensing mode, as each sensor element needs only one connection wire to the sensing circuit. For the self-capacitance sensing mode, touching the sensor element increases the sensor capacitance as the finger touch capacitance is added to the sensor capacitance. The mutual capacitance change is detected in the mutual capacitance-sensing mode. Each sensor element uses at least two electrodes: one is a transmitter (TX) electrode (also referred to herein as transmitter electrode), and the other is a receiver (RX) electrode. When a finger touches a sensor element or is in close proximity to the sensor element, the capacitive coupling between the receiver and the transmitter of the sensor element is decreased as the finger shunts part of the electric field to ground (e.g., chassis or earth).

BRIEF DESCRIPTION OF THE DRAWINGS

The present disclosure is illustrated by way of example, and not by way of limitation, in the figures of the accompanying drawings.

DETAILED DESCRIPTION

Figure 1:
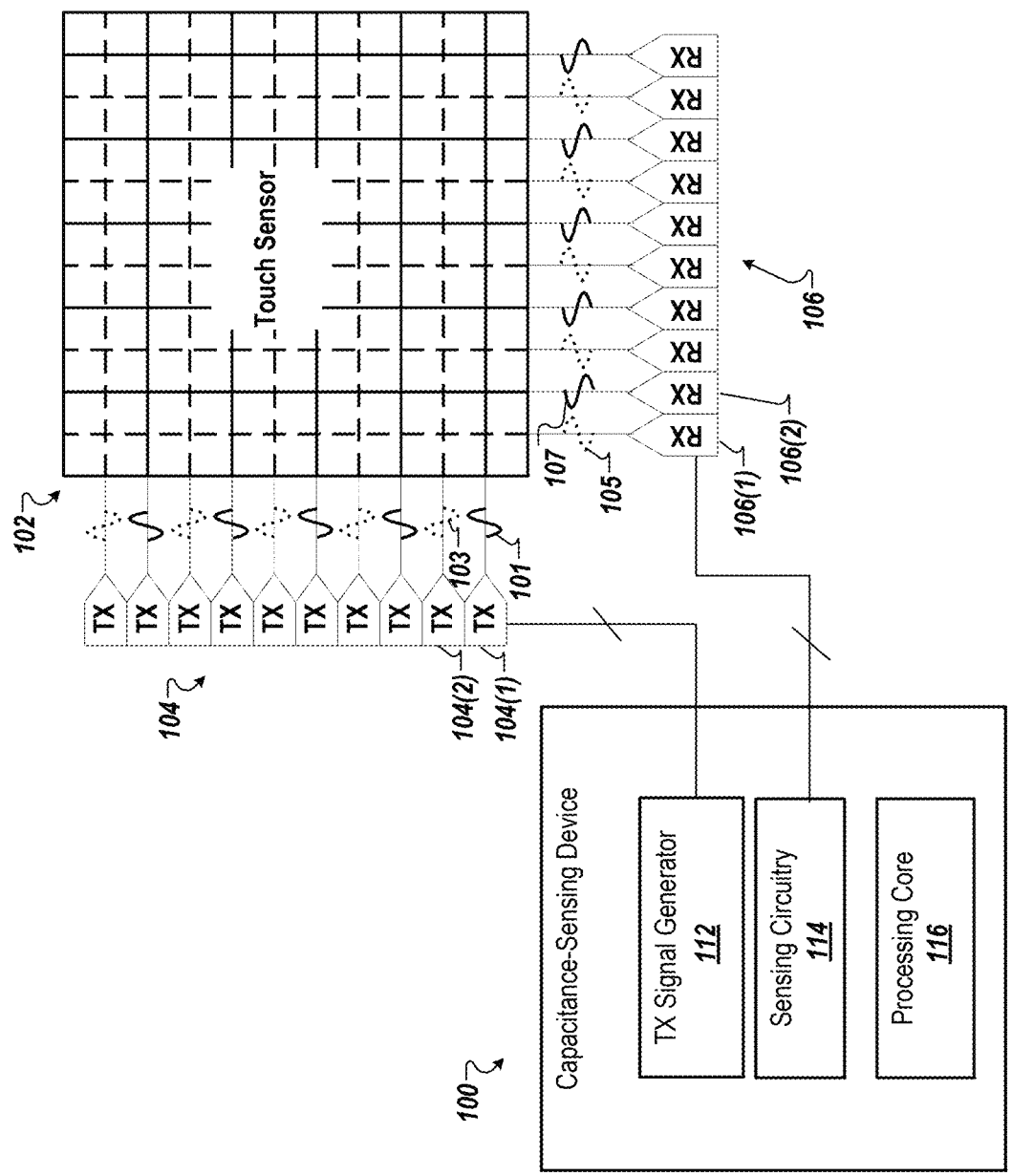
FIG. 1 is a block diagram of a capacitance-sensing device with capacitance-sensing circuitry that drives a touch panel with differential waveforms according to one embodiment.

Touch panels (e.g., touch screens) that are used in consumer electronics and automotive settings are increasingly utilizing larger screen sizes, for example, greater than 12.3 inches. At the same time, such large screen sizes are subject to stricter specification requirements on radiated electromagnetic emission, particularly in longwave (e.g., frequencies less than approximately 540 kHz) frequencies bands and medium-wave frequency bands (e.g., frequencies between approximately 530 kHz and 1700 kHz). Existing capacitance-sensing devices utilizing square-wave excitations have a radiated electromagnetic emission that exceeds the current limit. Further, the operation of capacitance-sensing devices can be affected by external common-mode noise from sources such as the operation of liquid-crystal display (LCD) screens, electrical ballasts, handheld transceivers, amplitude-modulated (AM) radio, and testing procedures (such as tests in electromagnetic immunity (EMI) and/or electromagnetic compatibility (EMC) chambers). Thus, there is a need for exciting and scanning capacitance-sensing touch panels while minimizing electromagnetic emission and increasing electromagnetic immunity.

Conventional techniques for reducing electromagnetic emission include frequency spreading (e.g., TX spreader) and sine-wave excitation. Frequency spreading is a technique to reduce (e.g., spread) peaks of harmonics in the emission spectrum but modulating square-wave excitation signals. While frequency spreading mitigates electromagnetic emission, it limits a sensing frequency range for large panels and small scanning times and introduces electromagnetic immunity problems (e.g., decreases the signal-to-noise ratio (SNR), is less robust to LCD noise). As the width of the harmonics increases, the noise transfer function of the receive channel increases, which increases the susceptibility of the system to wideband noise. In the case of sine-wave excitation, only a single harmonic is present in the emission spectrum, and the system can be designed to place the main harmonic in a frequency range to minimize noise. However, this can lead to higher power consumption, higher cost, and strict requirements on scanning times and phases. Further, sine-wave excitation does not reduce or suppress electromagnetic emission compared to square-wave excitation, as the emission energy is similar, but concentrated at the main harmonic. Additionally, because the frequency range is limited, the SNR is decreased.

As a particular noise and EMC-related emission problem when employing sinusoidal drive signals (such as sinewave), if an in-phase drive signal and an opposite-phase drive signal are not switched at the same time, a glitch can occur around the time of switching between applying in-phase and opposite-phase drive signals at any given TX electrode. Thus, a series of glitches can occur over time at different TX electrodes as phase switching occurs.

Aspects of the present disclosure and embodiments overcome the deficiencies above and others by detecting when a sinusoidal wave generator that generates the in-phase and opposite-phase drive signals switches phases (e.g., between excitation frames) as well as when the in-phase drive signal and the opposite-phase drive signal actually cross each other. The capacitive-sense circuitry can then trigger, when these events coincide, the actual switching of the in-phase drive signal and the opposite-phase drive signal according to a multi-phase switching pattern that is pre-loaded, thus reducing EMC emissions. The capacitive-sense circuitry can further, to reduce EMI emissions, provide capacitance-sensing circuitry that differentially drives adjacent electrodes with differential waveforms and measures charges on adjacent electrodes to determine a self capacitance associated with a presence of an object.

In at least one embodiment, an apparatus includes a sinusoidal wave generator that generates, over a first analog line, an in-phase drive signal and, over a second analog line, an opposite-phase drive signal. In some embodiments, these drive signals are sine-wave signals. The apparatus can further include a comparator with inputs respectively coupled to the first analog line and the second analog line. The comparator can assert a first output in response to detecting a crossing between the in-phase drive signal and the opposite-phase drive signal. The apparatus can further include multi-phase switching logic coupled to an output of the comparator. The multi-phase switching logic can assert a second output in response to both detecting the first output and receiving a signal indicative of a phase switch of the sinusoidal wave generator. In embodiments, the second output controls timing of applying a multi-phase switching pattern to sets of switches coupled between the first analog line and the second analog line and respective ones of transmission (TX) electrodes of a touch panel.

In some embodiments, a corresponding method can include generating, by the sinusoidal wave generator, an in-phase drive signal and an opposite-phase drive signal to excite transmission (TX) electrodes of a touch panel. The method includes comparing the in-phase drive signal and the opposite-phase drive signal to detect a crossing between the in-phase drive signal and the opposite-phase drive signal. The method can include asserting a logical output responsive to detecting the crossing between the in-phase drive signal and the opposite-phase drive signal and receiving a signal, indicative of a phase switch, from the timer table controller, e.g., where the phase switch is associated with a transition to a new excitation frame. The method can include applying, responsive to receipt of the logical output, a multi-phase switching pattern to sets of switches coupled between the in-phase and opposite-phase drive signals and the TX electrodes.

It should be noted that the capacitance-sensing circuitry can detect conductive objects and other objects (also referred to as touch objects). An object, or touch object, is any object that disturbs the electrical field and reduces the coupling between the receiver and transmitter electrodes for the capacitance sensing techniques. For example, if a user touches the touch surface wearing gloves, the capacitance-sensing circuitry may not detect the user's finger as a conductive object, but the capacitance-sensing circuitry can still detect the user's finger because the user's finger still disturbs the electrical field and reduces the coupling between the electrodes. It should also be noted that the embodiments described herein can be used on touch panels having more than two transmitter electrodes and receiver electrodes as described below. Also, the capacitance-sensing circuitry can detect a hover event of a conductive object above the touch panel.

The following description sets forth numerous specific details, such as examples of specific systems, components, methods, and so forth, in order to provide a good understanding of several embodiments of the present invention. However, it will be apparent to one skilled in the art that at least some embodiments of the present invention may be practiced without these specific details. In other instances, well-known components or methods are not described in detail or presented in a simple block diagram format to avoid unnecessarily obscuring the present invention. Thus, the specific details set forth are merely exemplary. Particular implementations may vary from these exemplary details and still be contemplated to be within the spirit and scope of the present invention.

References in the description to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

FIG. 1 is a block diagram of capacitance-sensing device 100 with capacitance-sensing circuitry that drives a touch panel 102 with differential waveforms according to one embodiment. Capacitance-sensing device 100 provides at least one example of differential exciting and scanning with a sequence to support a differential self-capacitance sensing mode. The capacitance-sensing device 100 can support other capacitance-sensing modes, such as mutual capacitance or self capacitance. FIG. 1 illustrates a capacitance-sensing device with a touch-controller architecture with a sensing grid (e.g., a sense panel, the touch panel 102, or a capacitance matrix) with a rectangular array of sense electrodes. The rectangular array of sense electrodes can include an integer number, M, of TX electrodes 104 and an integer number, N, of RX electrodes 106. In at least one embodiment, multiplexers can connect the panel electrodes to one or more sense channels and multiplex signals between the in-phase drive signal and the opposite-phase drive signal.

Capacitance-sensing device 100 may include capacitance-sensing circuitry, which can be capable of one or both transmitting and receiving. In some embodiments, TX signal generator 112 can generate an in-phase drive signal and an opposite-phase drive signal and select an excitation sequence with a number of positive and negative ones, corresponding to the in-phase drive signals and the opposite-phase drive signals, respectively. The excitation sequence can be selected such that the sum of the excitation sequence is zero. Alternatively, the excitation sequence can be selected such that the sum is not zero. In the case where the excitation sequence has a sum of zero, the excitation sequence can be referred to as a zero-sum excitation sequence. At the first scanning stage, TX signal generator 112 can apply an in-phase drive signal 101 to one or more TX electrodes 104 simultaneously and according to the excitation sequence. Also, at the first scanning stage, TX signal generator 112 applies an opposite-phase drive signal 103 to one or more TX electrodes 104 simultaneously and according to the excitation sequence. The TX signal generator 112 applies the in-phase drive signal 101 and the opposite-phase drive signal 103 to adjacent TX electrodes 104. Further, sensing circuitry 114 can include two or more RX signal receivers that receive sense signals from RX electrodes 106 to detect a presence of an object (such as a finger or other conductive object) on the touch panel 102 of capacitance-sensing device 100. The sense signals represent capacitances associated with RX electrodes 106. In particular, a first RX receiver can receive first sense signals from a first RX electrode and second sense signals from a second RX electrode adjacent to the first RX electrode. A second RX receiver can receive the second sense signals and third sense signals from a third RX electrode adjacent to the second RX electrode.

In some embodiments, a first RX signal receiver can sense the opposite-phase drive signal 105 from a first RX electrode and the in-phase drive signal 107 from a second electrode. The sense signals can be representative of capacitances associated with receiver electrodes 106 and can be received by sensing circuitry 114 to detect a presence of an object on the touch panel 102. The capacitance-sensing device 100 is configured to use the TX signal generator 112 to generate in-phase drive signal 101 and opposite-phase drive signal 103 and apply, at a substantially same time, in-phase drive signal 101 to a first TX electrode 104(1) and opposite-phase drive signal 103 to a second TX electrode 104(2) adjacent to the first electrode 104(1). The capacitance-sensing device 100 uses the sensing circuitry 114 to receive a first sense signal 105 from a first RX electrode 106(1) and a second sense signal 107 from a second RX electrode 106(2) adjacent to the first receiver electrode 106(1). The sensing circuitry 114 combines the first sense signal 105 and the second sense signal 107 to obtain a third sense signal. The third sense signal represents a first self capacitance associated with the first receiver electrode 106(1). Combining the first sense signal 105 and second sense signal 107 cancels out panel parasitics. The capacitance-sensing device 100 uses a processing core 116 to detect a presence of an object on the touch panel 102 using at least the first self capacitance. In another embodiment, the capacitance-sensing device 100 includes analog-to-digital converter (ADC) circuitry coupled to the sensing circuitry 114 to convert the sense signal into digital values.

Figure 2A:
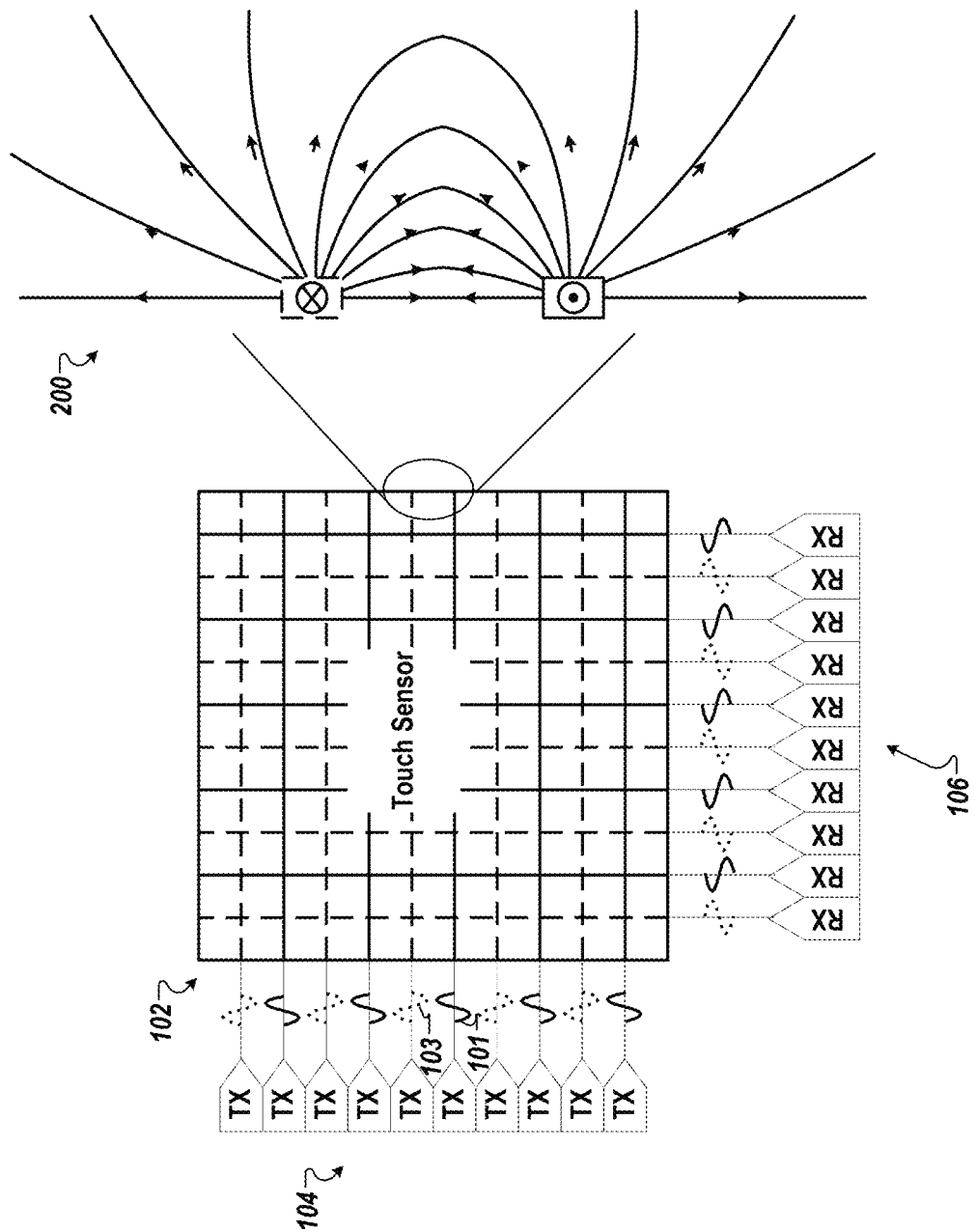
FIG. 2A illustrates an electromagnetic field caused between two electrodes when the touch panel is driven by all differential waveforms according to one embodiment.
Figure 2B:
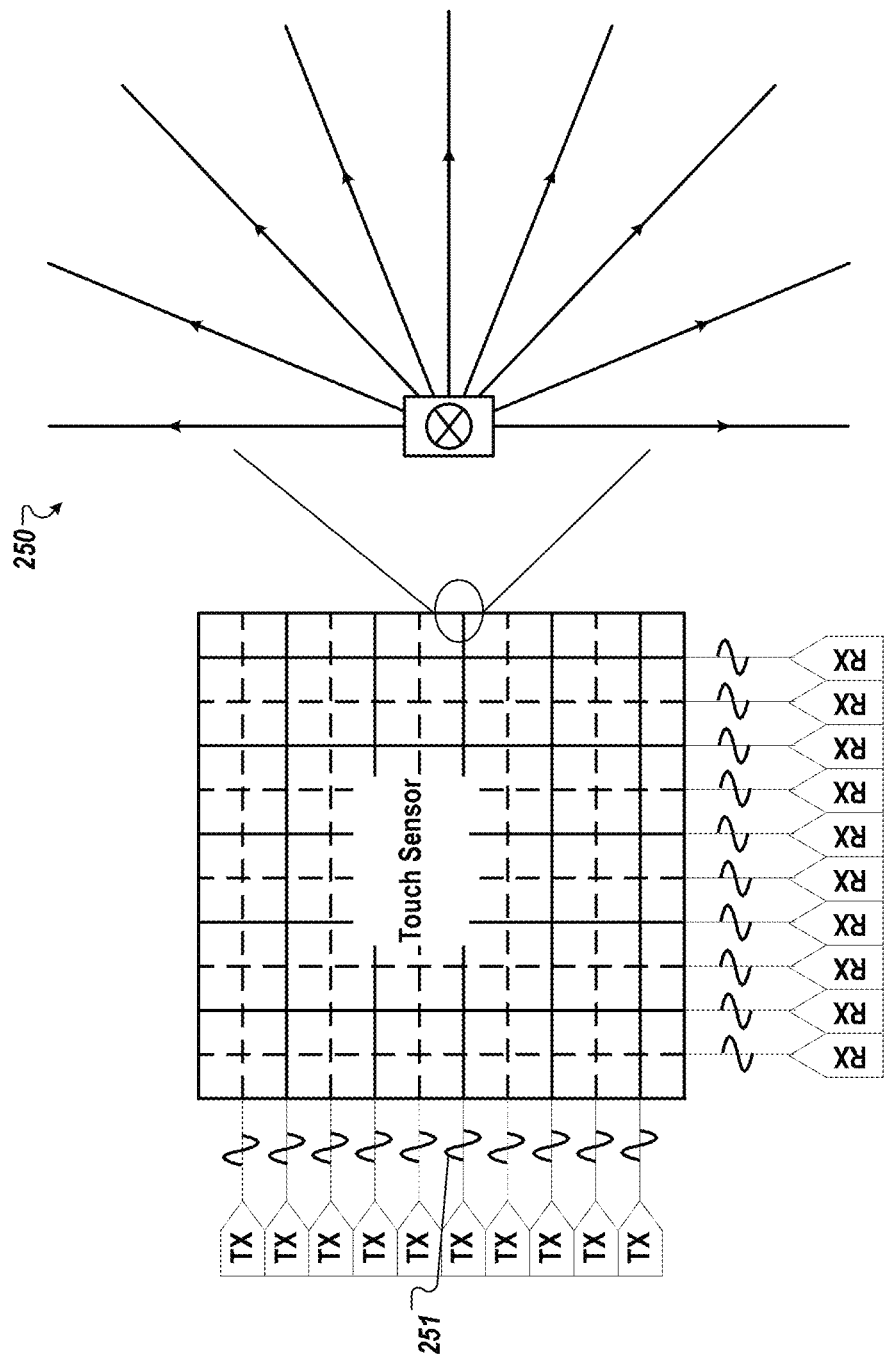
FIG. 2B illustrates an electromagnetic field caused at one electrode when the touch panel is driven by all in-phase waveforms according to one embodiment.

As described above, the capacitance-sensing device 100 drives adjacent electrodes with differential waveforms, reducing or suppressing the touch panel's EMI, as illustrated in FIG. 2A, compared to a touch panel driven with all in-phase waveforms, as illustrated in FIG. 2B. FIG. 2A illustrates an electromagnetic field 200 caused between two electrodes when the touch panel 102 is driven by all differential waveforms according to one embodiment. The electromagnetic field 200 is simplified as showing the field between two electrodes that are differentially driven. In particular, a first transmit electrode is driven with the in-phase drive signal 101 and a second transmit electrode, which is adjacent to the first transmit electrode, is driven with the opposite-phase drive signal 103. Differentially driving adjacent electrodes reduces panel radiation, resulting in low EMI. FIG. 2B illustrates an electromagnetic field 250 caused at one electrode when the touch panel 102 is driven by all in-phase waveforms according to one embodiment. The electromagnetic field 250 is simplified as showing the field caused by one electrode where the touch panel 102 is driven with all in-phase drive signals 251. Driving all in-phase waveforms results in higher panel radiation than differentially driving adjacent electrodes, as illustrated in FIG. 2A. The higher panel radiation results in higher EMI. In at least one embodiment, differentially driving adjacent electrodes can reduce the power at the electrodes by 15 times and produce 7-9 times less field and voltage amplitude than driving all electrodes with in-phase waveforms.

Figure 3:
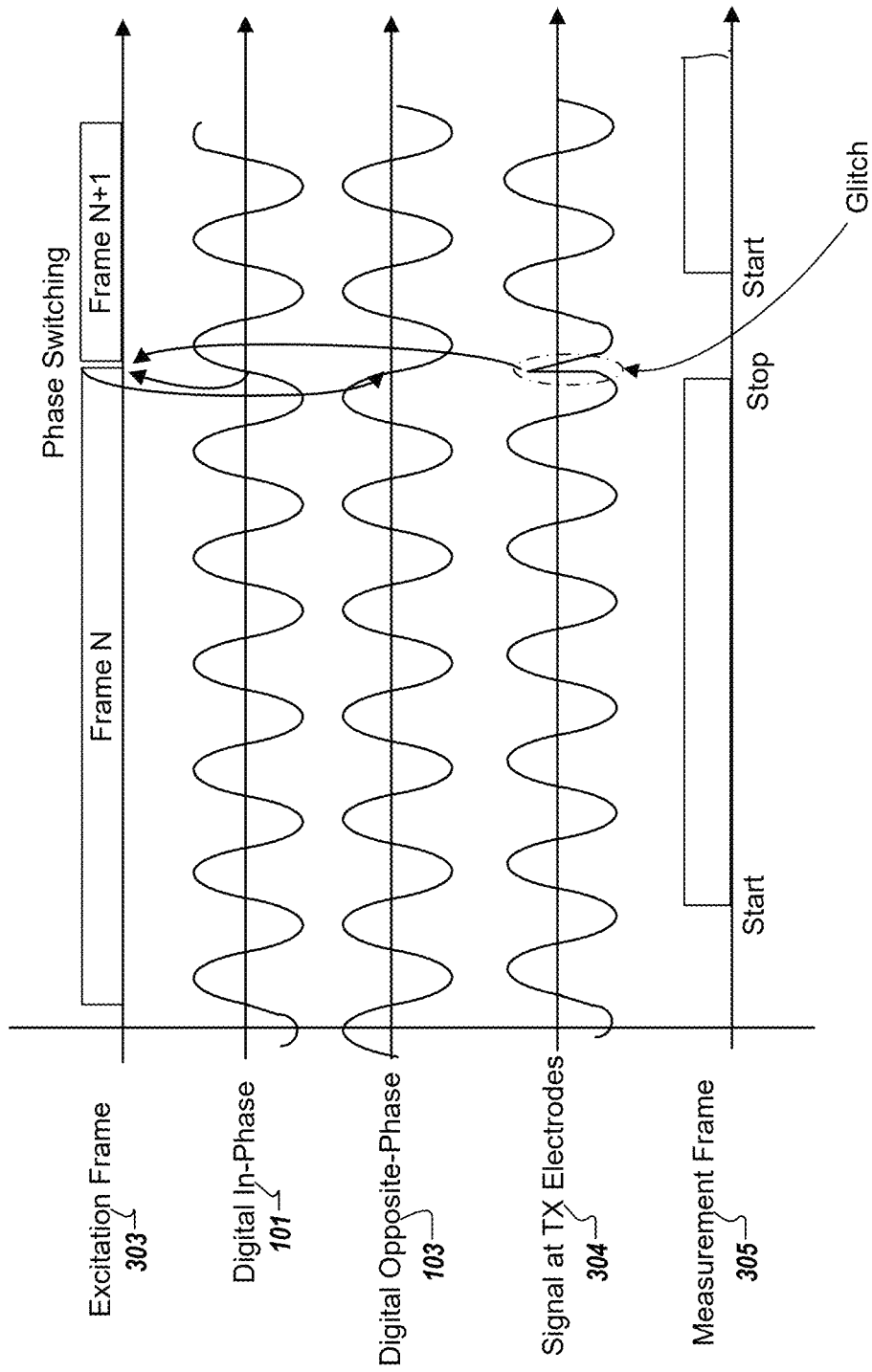
FIG. 3 is a multi-phase switching graph illustrating generation of a glitch when in-phase and opposite-phase drive signals are switched when not crossing zero at the same time according to an embodiment.

FIG. 3 is a multi-phase switching graph illustrating generation of a glitch when in-phase and opposite-phase drive signals are switched when not crossing zero at the same time according to an embodiment. For example, an excitation frame signal 301 illustrates timing of triggering an excitation frame by the TX signal generator 112, e.g., as a phase-switch transition between Frame N and Frame N+1. Also illustrated is the in-phase drive signal 101 followed by the opposite-phase drive signal 103 followed by a signal 304 at the TX electrodes 104. At the bottom is illustrated a measurement frame signal 305 of the start and stop timing of capacitive measurements for sensing touch. As can be seen, as the phase switches or changes between Frame N and Frame N+1, a glitch occurs because the in-phase drive signal 101 and the opposite-phase drive signal 103 are misaligned, e.g., do not cross each other as the phase switches according to the execution frame signal 303.

Figure 4:
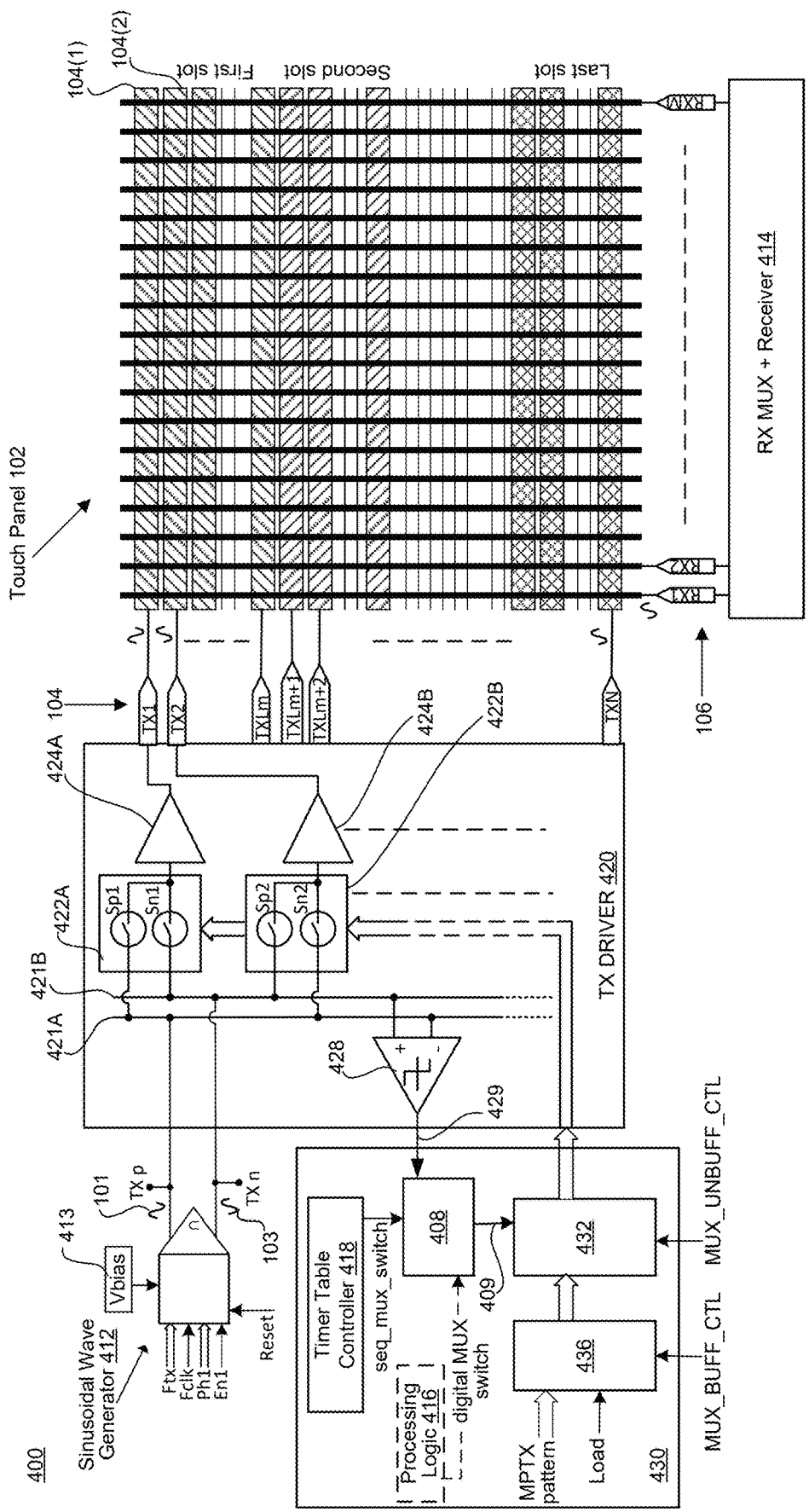
FIG. 4 is a schematic block diagram of a capacitance-sensing device adapted to improve timing of applying a switching pattern to TX electrodes to reduce electromagnetic emissions according to some embodiments.

FIG. 4 is a schematic block diagram of a capacitance-sensing device 400 (or system) adapted to improve timing of applying a switching pattern to TX electrodes to reduce electromagnetic emissions according to some embodiments, in particular, EMI emissions. In embodiments, the capacitance-sensing device 400 includes a receive multiplexer and receiver 414 that is coupled, e.g., between the RX electrodes 106 and the sensing circuitry 114, which were discussed with reference to FIG. 1.

In embodiments, the capacitance-sensing device 400 includes a sinusoidal wave generator 412 that is biased by voltage bias (Vbias) input 413. The sinusoidal wave generator 412 can generate, based on an input clock (Fclk) and phase (Phi), the in-phase drive signal 101 and the opposite-phase drive signal 103 of a sinusoidal wave to be used to excite the TX electrodes 104 of the touch panel 102, which were discussed with reference to FIG. 1 and FIGS. 2A-2B. In embodiments, the sinusoidal wave is a sine wave, a cosine wave, or the like. For example, the sinusoidal wave generator 412 can be a sine wave generator that is to generate an in-phase sine-wave signal and an opposite-phase sine-wave signal, centered around the bias voltage, which are then used to excite the TX electrodes 104.

In various embodiments, the capacitance-sensing device 400 also includes a transmission driver 420 to buffer and alternatively apply the in-phase drive signal 101 and the opposite-wave drive signal 103 to the TX electrodes 104. More specifically, the TX driver 420 can include a first analog line 421A (e.g., analog bus line) coupled to the in-phase drive signal 101 output and a second analog line 421B (e.g., analog bus line) coupled to the opposite-phase drive signal 103 output of the sinusoidal wave generator 412. Buffers can be switched between the first analog line 421A and the second analog line 421B and the TX electrodes 104, e.g., to buffer the in-phase and opposite-phase drive signals while they are applied to particular ones of TX electrodes 104. Further, a series of pairs of switches can be coupled between the first analog line and the second analog line and each buffer.

Illustrated by way of example, according to various embodiments, a first TX buffer 424A is coupled to the first TX electrode 104(1) and a first set of switches 422A is coupled between the first and second analog lines 421A and 421B and the first TX buffer 424A. Further, a second TX buffer 424B is coupled to the second TX electrode 104(2) and a second set of switches 422B is coupled between the first and second analog lines 421A and 421B and the second TX buffer 424B. The first set of switches 422A can include a first switch (Sp1) coupled to the first analog line 421A and a second switch (Sn1) coupled to the second analog line 421B, where the first and second switches alternate according to a pattern to rotate between driving with the in-phase drive signal 101 and the opposite-phase drive signal 103. Similarly, the second set of switches 422B can include a first switch (Sp2) coupled to the second analog line 421B and a second switch (Sp1) coupled to the first analog line 421A. Thus, for example, switches Sp1 and Sn2 during a time period that are then switched to Sp2 and Sn1 for the next period. The effect of switching this pattern back and forth is to cycle between in-phase and anti-phase drive signals at the respective TX electrodes. The switching between switches of the first and second sets of switches 422A and 422B can occur a the start of a new excitation frame (e.g., see frame N+1 in FIG. 3).

Figure 5:
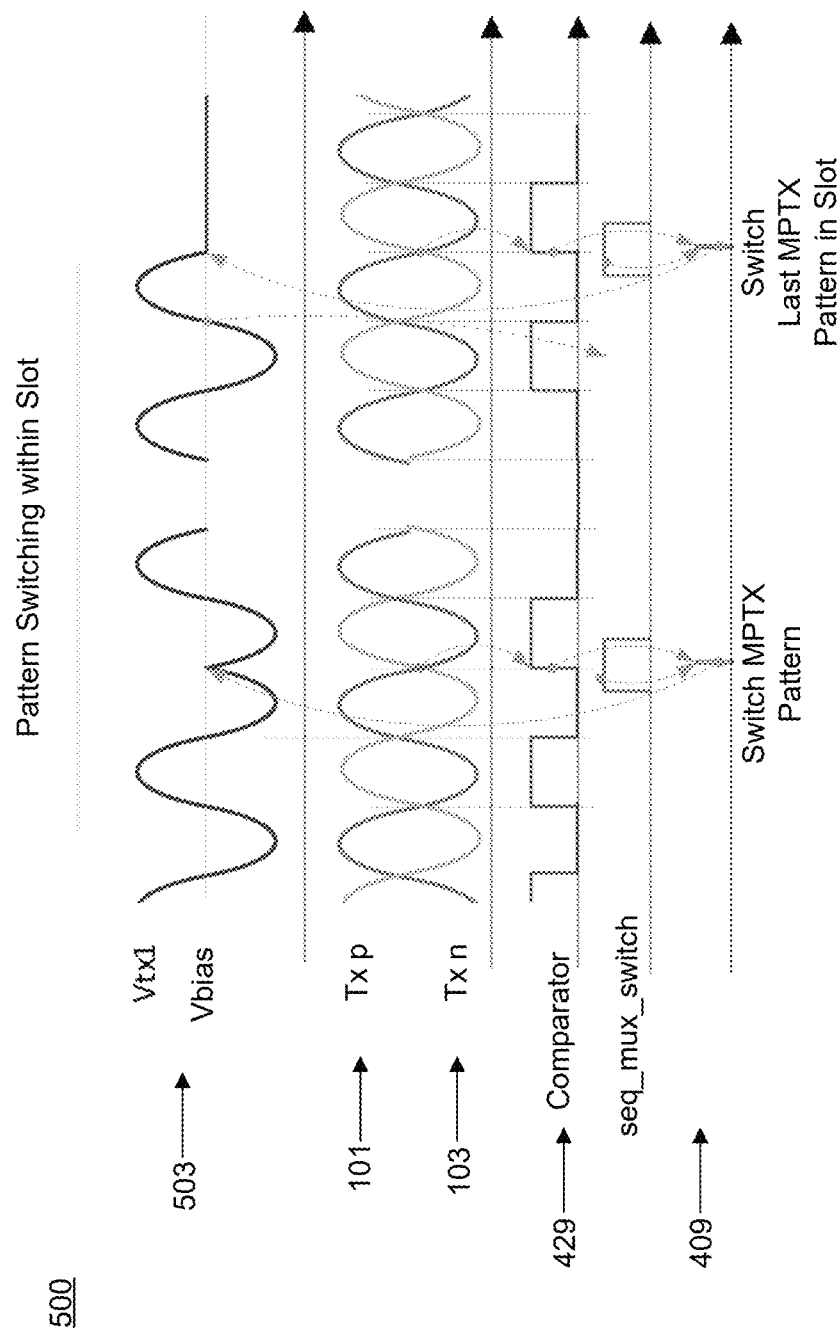
FIG. 5 is a signal timing graph illustrating the timed switching of the in-phase and opposite-phase drive signals according to some embodiments.

In some embodiments, the TX driver 420 also includes a comparator 428 having inputs respectively coupled to the first analog line 421A and the second analog line 421B. More specifically, a negative terminal input of the comparator 428 is connected or coupled to the first analog line 421A and the positive terminal input is connected or coupled to the second analog line 421B. In embodiments, the comparator 428 asserts a first output 429 in response to detecting a crossing between the in-phase drive signal 101 and the opposite-phase drive signal 103, as is illustrated in FIG. 5. The detected crossing can be a zero-crossing location of both the two signals. In other embodiments, the comparator 428 is located outside of the TX driver 420. In some embodiments, the comparator 428 is an analog, zero crossing comparator designed to detect the crossing of the in-phase and the opposite-phase drive signals 101 and 103.

In some embodiments, the capacitance-sensing device 400 includes a timing control circuitry 430 configured to control the timing of pattern switching applied to the series of pairs of switches, e.g., that includes the first and second sets of switches 422A and 422B. In some embodiments, the timing control circuitry 430 includes the comparator 428, e.g., in lieu of the TX driver 420. In at least some embodiments, the timing control circuitry 430 includes multi-phase switching logic 408 coupled to an output of the comparator 428. The multi-phase switching logic 408 can assert a second output 409 in response to both detecting the first output and receiving a signal indicative of a phase switch of the sinusoidal wave generator 412. In embodiments, the second output 409 controls timing of applying a multi-phase switching pattern to sets of switches coupled between the first analog line 421A and the second analog line 421B and respective ones of the TX electrodes 104 of a touch panel 102.

In optional embodiments, the timing control circuitry 430 includes (or is coupled to) processing logic 416 coupled to the multi-phase switching logic 408. The processing logic 416 can be configured to supply the aforementioned signal (e.g., digital MUX switch), to the multi-phase switching logic 408, indicative of timing of the phase switch between excitation frames of the sinusoidal wave generator 412. The processing logic 416 can be processing core 116 (FIG. 1), a programmed processor, or other processing logic. In some embodiments, the processing logic 416 executes firmware to track the excitation frame transitions of the sinusoidal wave generator 412 (see FIG. 3).

In other embodiments, the timing control circuitry 430 includes (or is coupled to) a timer table controller 418 coupled to the multi-phase switching logic 408. In embodiments, the timer table controller 418 asserts the aforementioned signal (e.g., seq_mux_switch), to the multi-phase switching logic 408, indicative of the phase switch detected between excitation frames of sinusoidal wave generator 412 (see FIG. 3). For example, in some embodiments, the timer table controller 418 is programmed with a precise timing so that the timer table controller 418 asserts the seq_mux_switch signal before a new excitation pattern starts. Assuming the timer table controller 418 functions off the same clock as the sinusoidal wave generator 412, the asserted series of seq_mux_switch signals will retain the precise timing of the excitation pattern transitions of the sinusoidal wave generator 412.

In alternative embodiments, the digital MUX switch signal is programmed based on whether the first output 429 of the comparator 428 is required by the multi-phase switching logic 408. For example, if the digital MUX switch signal is asserted high (e.g., a logical "1"), the first output 429 from the comparator 428 may not be taken into account. Instead, the multi-phase switching logic 408 can receive and use the seq_mux_switch signal from the timer table controller 418 to directly control the switching of the contents of buffered and unbuffered data.

If, however, the digital MUX switch signal is de-asserted low (e.g., a logical "0"), the first output 429 from the comparator 428 can be taken into account. In such embodiments, the assertion of the seq_mux_switch signal may not directly control the switching of the contents of the buffered and unbuffered data. Instead, the switching may not occur until both the seq_mux_switch signal is asserted high and the first output 429 of the comparator 428 is also toggled thereafter.

In embodiments, the timing control circuitry 430 a transmission pattern control register 432 coupled between the multi-phase switching logic 408 and the series of pairs of switches. The transmission pattern control register 432 can apply, responsive to receipt of the second output 409, the multi-phase switching pattern (e.g., the MPTX pattern) to sets of switches. Recall that the second output 409 is output by the multi-phase switching logic 408, as was discussed. In embodiments, this MPTX pattern includes two sets of patterns, one for switches Sp1 and Sn1 and another for Sp2 and Sn2. In embodiments, the timing control circuitry 430 includes a transmission pattern register 436 coupled to the transmission pattern control register 432. The transmission pattern register 436 can buffer a pre-loaded transmission pattern and transfer the pre-loaded transmission pattern to the transmission pattern control register 432 in response to receiving the second output 409. In this way, the MPTX pattern can be uploaded in different applications based on being loaded into the transmission pattern register 436.

FIG. 5 is a signal timing graph 500 illustrating the timed switching of the in-phase and opposite-phase drive signals according to some embodiments. An output signal 503 at the top of the timing graph 500 includes a sinusoidal drive signal illustrating switching within a slot of the TX electrodes 104. Next are illustrated the in-phase drive signal 101 and the opposite-phase drive signal 103 superimposed on each other, so it can be clearly seen where they cross, e.g., at a zero-crossing point. Next is a signal waveform of the first output 429 from the comparator 428. After that is a signal waveform of the sequence multiplexer switch (seq_mux_switch) signal received from the timer table controller 418 or the digital multiplexer switch from the processing logic 416. Next are pulses that activate the switch in the MPTX pattern in the slot of TX electrodes 104.

As can be seen, when the first output 429 of the comparator 428 is asserted at the same time that the seq_mux_switch indicates a phase switch is occurring between excitation frames, the second output 409 is asserted, causing a change in the multi-phase switching pattern to be applied to the sets of switches 422A and 422B, for example. During such a pattern change or switch, once the comparator 428 is toggled and a "seq_mux_switch" event is detected, then the MPTX pattern switching can happen close to the crossings of the two TX sine waves, e.g., of the in-phase drive signal 101 and the opposite-phase drive signal 103. In illustrated embodiments, this timed MPTX pattern switching minimizes the glitch at the TX driver outputs, which minimize EMC emissions and transient supply current spike on the TX drivers. For example, in the output signal 503 illustrated at the top of the timing graph 500 illustrates a sine-wave inversion to transition to the next excitation frame rather than a glitch.

Figure 6:
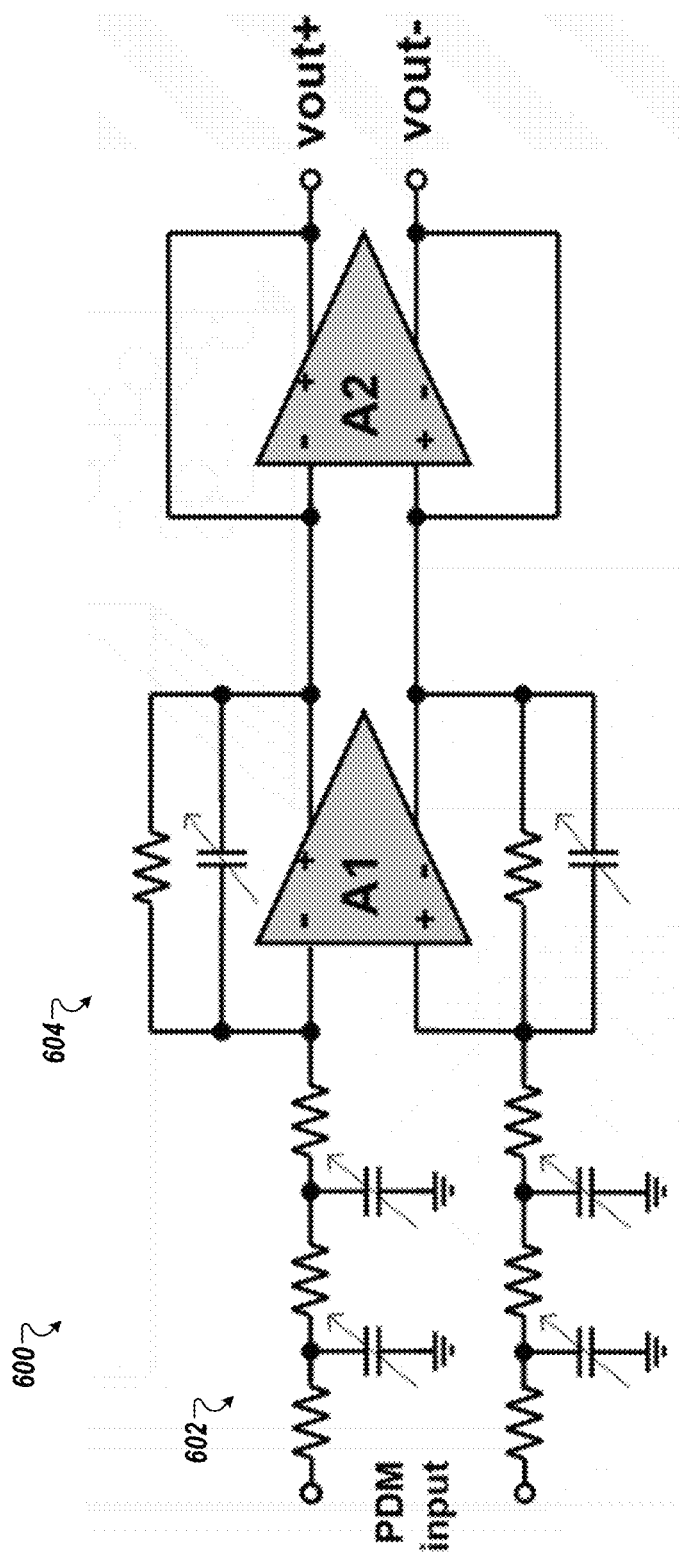
FIG. 6 is a circuit diagram of a differential sine-wave generator according to one embodiment.

FIG. 6 is a circuit diagram of a differential sine-wave generator 600 according to one embodiment. The differential sine-wave generator 600 can be the TX signal generator 112 of FIG. 1. Alternatively, the TX signal generator 112 of FIG. 1 can be other types of signal generators, such as a differential square-wave signal generator that generates in-phase and opposite-phase square-wave signals. As illustrated in FIG. 6, the differential sine-wave generator 600 is fully differential and includes a low pass filter input and passive network 602 that is implemented differentially and amplifiers 604 in a fully differential topology. The differential sine-wave generator 600 can suppress even harmonics, have better Total Harmonic Distortion (THD)/Spurious Free Dynamic Range (SFDR), and be implemented in less area than other signal generators. The THD/SFDR are two parameters that show how much smaller the harmonics or unwanted signals are relative to the fundamental tone.

Figure 7:
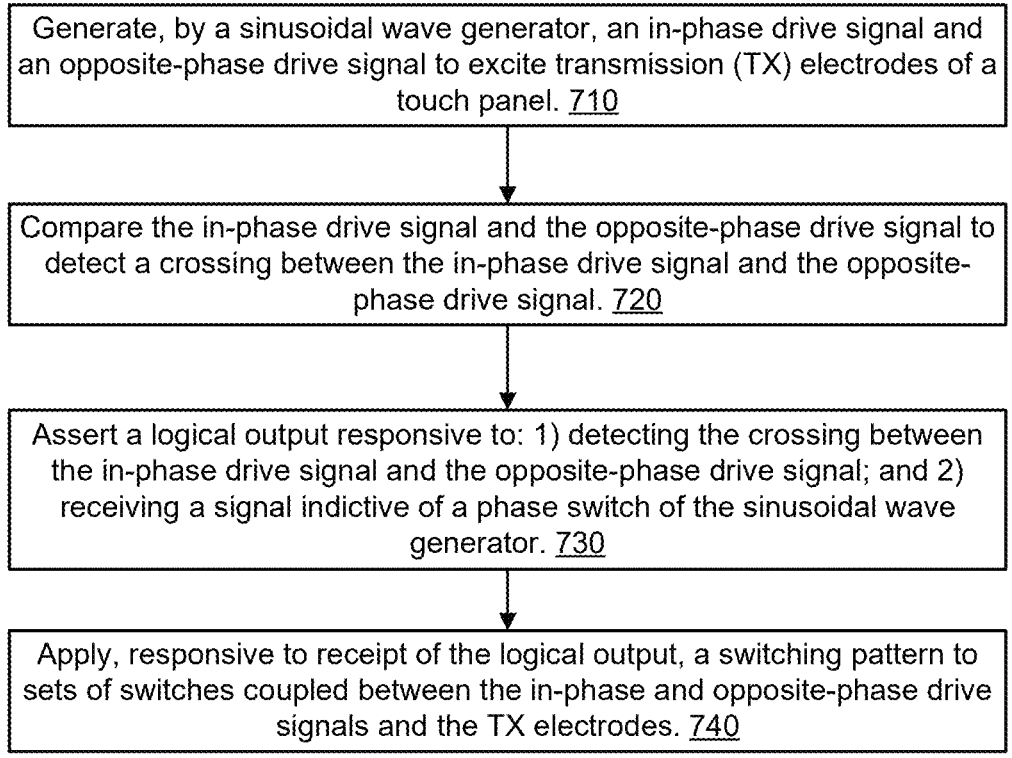
FIG. 7 is a flow diagram of one embodiment of a method for triggering multi-phase transmission pattern switching to reduce emissions in touch-sensing devices according to one embodiment.

FIG. 7 is a flow diagram of one embodiment of a method 700 for triggering multi-phase transmission pattern switching to reduce emissions in touch-sensing devices according to one embodiment. Method 700 can be performed by processing logic comprising hardware, firmware, or any combination thereof. Method 700 can be performed by capacitance-sensing device 100 of FIG. 1 and/or by capacitance-sensing device 400 of FIG. 4, to include by the timing control circuitry 430.

At operation 710, the method 700 includes generating, by a sinusoidal wave generator, an in-phase drive signal and an opposite-phase drive signal to excite transmission (TX) electrodes of a touch panel. In embodiments, generating, by the sinusoidal waver generator, the in-phase drive signal and in opposite-phase drive signal comprises generating, centered around a bias voltage, an in-phase sine-wave signal and an opposite-phase sine-wave signal.

At operation 720, the method 700 includes comparing the in-phase drive signal and the opposite-phase drive signal to detect a crossing between the in-phase drive signal and the opposite-phase drive signal.

At operation 730, the method 700 includes asserting a logical output responsive to: 1) detecting the crossing between the in-phase drive signal and the opposite-phase drive signal; and 2) receiving a signal indicative of a phase switch of the sinusoidal wave generator, e.g., between sequential excitation frames.

At operation 740, the method 700 includes applying, responsive to receipt of the logical output, a multi-phase switching pattern to sets of switches coupled between the in-phase and opposite-phase drive signals and the TX electrodes. In some embodiments, applying the multi-phase switching pattern includes applying the in-phase drive signal to a first set of switches coupled to a first TX electrode of the TX electrodes and applying the opposite-phase drive signal to a second set of switches coupled to a second TX electrode of the TX electrodes positioned adjacent to the first TX electrode.

In some embodiments, the method 700 further includes receiving, by multi-phase switching logic, from processing logic executing firmware, the aforementioned signal indicative of timing of the phase switch between excitation frames of the sinusoidal wave generator. In embodiments, asserting the logical output is performed by the multi-phase switching logic. In other embodiments, the method 700 includes receiving, by multi-phase switching logic, from a timer table controller, the aforementioned signal indicative of the phase switch detected between excitation frames of sinusoidal wave generator. In embodiments, asserting the logical output is performed by the multi-phase switching logic.

In various embodiments, the method 700 includes buffering, into a transmission pattern register, a pre-loaded transmission pattern and transferring the pre-loaded transmission pattern to a transmission pattern control register in response to the logical output. In embodiments, the multi-phase switching pattern is based on the pre-loaded transmission pattern.

Figure 8:
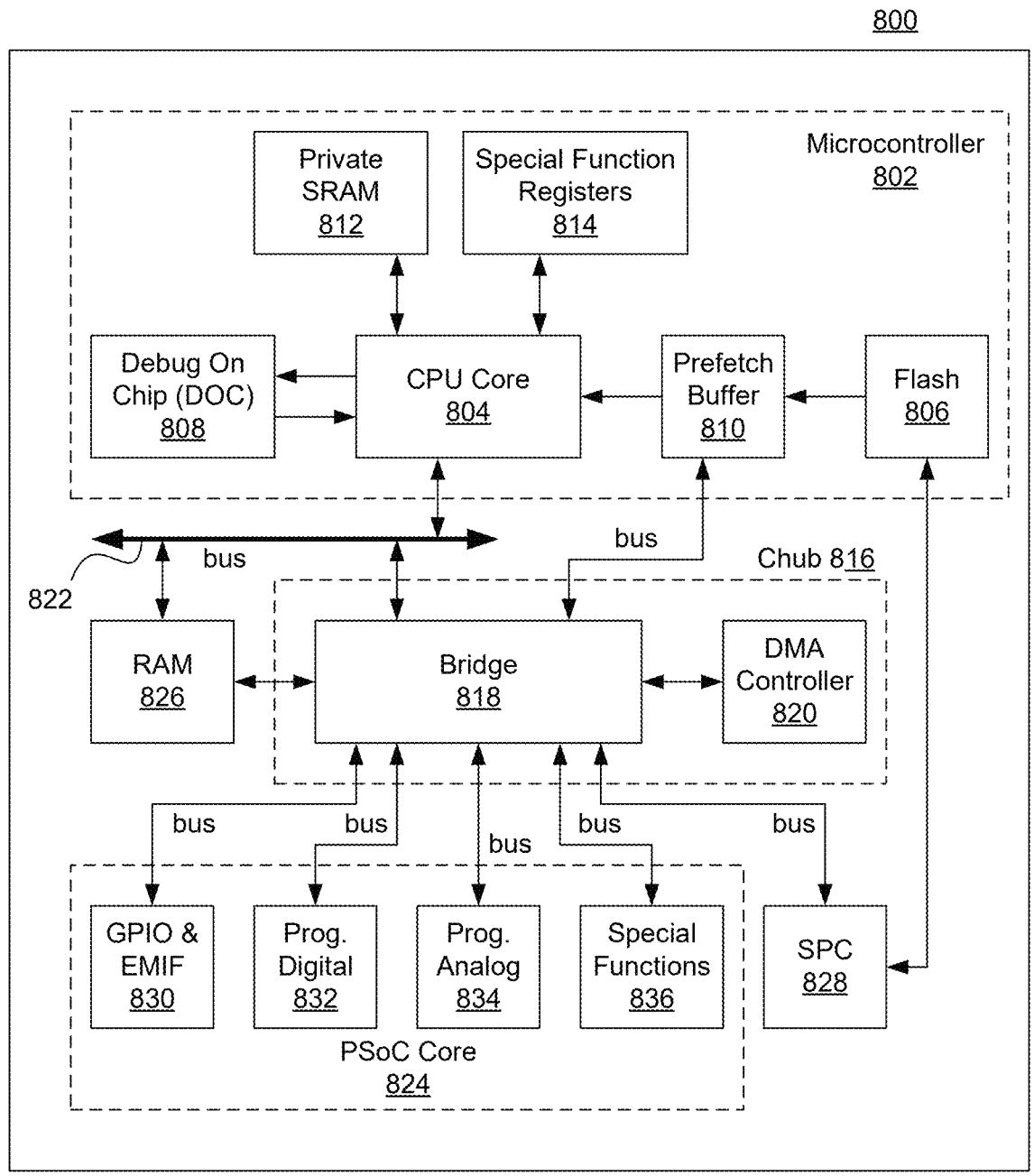
FIG. 8 illustrates an embodiment of a core architecture of the PSoC® processing device, such as that used in the PSoC3® family of products offered by Cypress Semiconductor Corporation (San Jose, California).

FIG. 8 illustrates an embodiment of a core architecture 800 of the PSoC® processing device, such as that used in the PSoC3® family of products offered by Cypress Semiconductor Corporation (San Jose, California). In one embodiment, the core architecture 800 includes a microcontroller 802. The microcontroller 802 includes a CPU (central processing unit) core 804, flash program storage 806, DOC (debug on-chip) 808, a prefetch buffer 810, a private SRAM (static random access memory) 812, and special functions registers 814. In an embodiment, the DOC 808, prefetch buffer 810, private SRAM 812, and special function registers 814 are coupled to the CPU core 804, while the flash program storage 806 is coupled to the prefetch buffer 810.

The core architecture 800 may also include a CHub (core hub) 816, including a bridge 818 and a DMA controller 820 coupled to the microcontroller 802 via bus 822. The CHub 816 may provide the primary data and control interface between the microcontroller 802 and its peripherals and memory, and a programmable core 824. In one embodiment, the timing control circuitry of FIG. 4 may be implemented in the core architecture 800, such as part of the programmable core 824. The DMA controller 820 may be programmed to transfer data between system elements without burdening the CPU core 804. In various embodiments, each of these subcomponents of the microcontroller 802 and CHub 816 may be different with each choice or type of CPU core 804. The CHub 816 may also be coupled to a shared SRAM 826 and an SPC (system performance controller) 828. The private SRAM 812 is independent of the shared SRAM 826 accessed by the microcontroller 802 through the bridge 818. The CPU core 804 accesses the private SRAM 812 without going through the bridge 818, thus allowing local register and RAM accesses to occur simultaneously with DMA access to shared SRAM 826. Although labeled here as SRAM, these memory modules may be any suitable type of a wide variety of (volatile or non-volatile) memory or data storage modules in various other embodiments.

In various embodiments, the programmable core 824 may include various combinations of subcomponents (not shown), including, but not limited to, a digital logic array, digital peripherals, analog processing channels, global routing analog peripherals, DMA controller(s), SRAM and other appropriate types of data storage, IO ports, and other suitable types of subcomponents. In one embodiment, the programmable core 824 includes a GPIO (general purpose IO) and EMIF (extended memory interface) block 830 to provide a mechanism to extend the external off-chip access of the microcontroller 802, a programmable digital block 832, a programmable analog block 834, and a special functions block 836, each configured to implement one or more of the subcomponent functions. In various embodiments, the special functions block 836 may include dedicated (non-programmable) functional blocks and/or include one or more interfaces to dedicated functional blocks, such as USB, a crystal oscillator drive, JTAG, and the like.

The programmable digital block 832 may include a digital logic array including an array of digital logic blocks and associated routing. In one embodiment, the digital block architecture is comprised of UDBs (universal digital blocks). For example, each UDB may include an ALU together with CPLD functionality.

In various embodiments, one or more UDBs of the programmable digital block 832 may be configured to perform various digital functions, including, but not limited to, one or more of the following functions: a basic I2C slave; an I2C master; an SPI master or slave; a multi-wire (e.g., 3-wire) SPI master or slave (e.g., MISO/MOSI multiplexed on a single pin); timers and counters (e.g., a pair of 8-bit timers or counters, one 16 bit timer or counter, one 8-bit capture timer, or the like); PWMs (e.g., a pair of 8-bit PWMs, one 16-bit PWM, one 8-bit deadband PWM, or the like), a level-sensitive I/O interrupt generator; a quadrature encoder, a UART (e.g., half-duplex); delay lines; and any other suitable type of digital function or combination of digital functions which can be implemented in a plurality of UDBs.

In other embodiments, additional functions may be implemented using a group of two or more UDBs. Merely for purposes of illustration and not limitation, the following functions can be implemented using multiple UDBs: an I2C slave that supports hardware address detection and the ability to handle a complete transaction without CPU core (e.g., CPU core 804) intervention and to help prevent the force clock stretching on any bit in the data stream; an I2C multi-master which may include a slave option in a single block; an arbitrary length PRS or CRC (up to 32 bits); SDIO; SGPIO; a digital correlator (e.g., having up to 32 bits with 4× over-sampling and supporting a configurable threshold); a LINbus interface; a delta-sigma modulator (e.g., for class D audio DAC having a differential output pair); an I2S (stereo); an LCD drive control (e.g., UDBs may be used to implement timing control of the LCD drive blocks and provide display RAM addressing); full-duplex UART (e.g., 7-, 8- or 9-bit with 1 or 2 stop bits and parity, and RTS/CTS support), an IRDA (transmit or receive); capture timer (e.g., 16-bit or the like); deadband PWM (e.g., 16-bit or the like); an SMbus (including formatting of SMbus packets with CRC in software); a brushless motor drive (e.g., to support 6/12 step commutation); auto BAUD rate detection and generation (e.g., automatically determine BAUD rate for standard rates from 1200 to 115200 BAUD and after detection to generate required clock to generate BAUD rate); and any other suitable type of digital function or combination of digital functions which can be implemented in a plurality of UDBs.

The programmable analog block 834 may include analog resources including, but not limited to, comparators, mixers, PGAs (programmable gain amplifiers), TIAs (trans-impedance amplifiers), ADCs (analog-to-digital converters), DACs (digital-to-analog converters), voltage references, current sources, sample and hold circuits, and any other suitable type of analog resources. The programmable analog block 834 may support various analog functions including, but not limited to, analog routing, LCD drive IO support, capacitance-sensing, voltage measurement, motor control, current to voltage conversion, voltage to frequency conversion, differential amplification, light measurement, inductive position monitoring, filtering, voice coil driving, magnetic card reading, acoustic doppler measurement, echo-ranging, modem transmission and receive encoding, or any other suitable type of analog function.

It should be noted that the embodiments described above use an in-phase signal, opposite phase signal, and a reference signal. The in-phase and opposite phases may be used when using inverters or complementary output stages to generate these signals. Also, the in-phase and opposite phase signals may be used for simplifying the measurement by the ADC as +1 or −1 data signs. However, in other embodiments, different arbitrary phase signals may be used. For example, an in-phase signal and one or more out-of-phase signals may be used.

Embodiments of the present invention, described herein, include various operations. These operations may be performed by hardware components, software, firmware, or a combination thereof. As used herein, the term "coupled to" may mean coupled directly or indirectly through one or more intervening components. Any of the signals provided over various buses described herein may be time-multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Certain embodiments may be implemented as a computer program product that may include instructions stored on a computer-readable medium. These instructions may be used to program a general-purpose or special-purpose processor to perform the described operations. A computer-readable medium includes any mechanism for storing or transmitting information in a form (e.g., software, processing application) readable by a machine (e.g., a computer). The computer-readable storage medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory, or another type of medium suitable for storing electronic instructions. The computer-readable transmission medium includes, but is not limited to, electrical, optical, acoustical, or other forms of propagated signal (e.g., carrier waves, infrared signals, digital signals, or the like), or another type of medium suitable for transmitting electronic instructions.

Additionally, some embodiments may be practiced in distributed computing environments where the computer-readable medium is stored on and/or executed by more than one computer system. In addition, the information transferred between computer systems may either be pulled or pushed across the transmission medium connecting the computer systems.

Although the operations of the method(s) herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. An apparatus comprising:
a sinusoidal wave generator that generates, over a first analog line, an in-phase drive signal and, over a second analog line, an opposite-phase drive signal;
a comparator having inputs respectively coupled to the first analog line and the second analog line and to assert a first output in response to detecting a crossing between the in-phase drive signal and the opposite-phase drive signal; and
multi-phase switching logic coupled to an output of the comparator, the multi-phase switching logic to assert a second output in response to both detecting the first output and receiving a signal indicative of a phase switch of the sinusoidal wave generator, wherein the second output is to control timing of applying a multi-phase switching pattern to sets of switches coupled between the first analog line and the second analog line and respective ones of transmission (TX) electrodes of a touch panel.

2. The apparatus of claim 1, wherein, to control the timing, the second output is to cause a change in the multi-phase switching pattern applied to the sets of switches.

3. The apparatus of claim 1, further comprising:
a transmission pattern control register to apply, responsive to receipt of the second output, the multi-phase switching pattern to sets of switches; and
a transmission pattern register coupled to the transmission pattern control register, the transmission pattern register to buffer a pre-loaded transmission pattern and transfer the pre-loaded transmission pattern to the transmission pattern control register in response to the second output.

4. The apparatus of claim 1, further comprising processing logic coupled to the multi-phase switching logic, the processing logic to supply the signal, to the multi-phase switching logic, indicative of timing of the phase switch between excitation frames of the sinusoidal wave generator.

5. The apparatus of claim 1, further comprising a timer table controller coupled between the sinusoidal wave generator and the multi-phase switching logic, the timer table controller to assert the signal, to the multi-phase switching logic, indicative of the phase switch detected between excitation frames of sinusoidal wave generator.

6. The apparatus of claim 1, wherein the sinusoidal wave generator is a sine wave generator that is to generate, centered around a bias voltage, an in-phase sine-wave signal and an opposite-phase sine-wave signal.

7. The apparatus of claim 1, further comprising:
a first TX electrode;
a first TX buffer coupled to the first TX electrode; and
a first set of switches coupled to the first TX buffer.

8. The apparatus of claim 7, further comprising:
a second TX electrode;
a second TX buffer coupled to the second TX electrode; and
a second set of switches coupled to the second TX buffer; and
wherein each of the first set of switches and the second set of switches are included in the sets of switches that are switched according to the multi-phase switching pattern.

9. A method comprising:
generating, by a sinusoidal wave generator, an in-phase drive signal and an opposite-phase drive signal to excite transmission (TX) electrodes of a touch panel;
comparing the in-phase drive signal and the opposite-phase drive signal to detect a crossing between the in-phase drive signal and the opposite-phase drive signal;
asserting a logical output responsive to: 1) detecting the crossing between the in-phase drive signal and the opposite-phase drive signal; and 2) receiving a signal indicative of a phase switch of the sinusoidal wave generator; and
applying, responsive to receipt of the logical output, a multi-phase switching pattern to sets of switches coupled between the in-phase and opposite-phase drive signals and the TX electrodes.

10. The method of claim 9, further comprising:
buffering, into a transmission pattern register, a pre-loaded transmission pattern; and
transferring the pre-loaded transmission pattern to a transmission pattern control register in response to the logical output, and wherein the multi-phase switching pattern is based on the pre-loaded transmission pattern.

11. The method of claim 9, further comprising:
receiving, by multi-phase switching logic, from processing logic executing firmware, the signal indicative of timing of the phase switch between excitation frames of the sinusoidal wave generator; and
wherein asserting the logical output is performed by the multi-phase switching logic.

12. The method of claim 9, further comprising:
receiving, by multi-phase switching logic, from a timer table controller, the signal indicative of the phase switch detected between excitation frames of sinusoidal wave generator; and
wherein asserting the logical output is performed by the multi-phase switching logic.

13. The method of claim 9, wherein generating, by the sinusoidal wave generator, the in-phase drive signal and in opposite-phase drive signal comprises generating, centered around a bias voltage, an in-phase sine-wave signal and an opposite-phase sine-wave signal.

14. The method of claim 9, wherein applying the multi-phase switching pattern comprises:
applying the in-phase drive signal to a first set of switches coupled to a first TX electrode of the TX electrodes; and
applying the opposite-phase drive signal to a second set of switches coupled to a second TX electrode of the TX electrodes positioned adjacent to the first TX electrode.

15. A system comprising:
a touch panel comprising a plurality of transmission (TX) electrodes;
a sinusoidal wave generator that generates, over a first analog line, an in-phase drive signal and, over a second analog line, an opposite-phase drive signal;
sets of switches coupled between the first analog line and the second analog line and respective ones of the plurality of TX electrodes;
a comparator having inputs respectively coupled to the first analog line and the second analog line and to assert a first output in response to detecting a crossing between the in-phase drive signal and the opposite-phase drive signal; and
multi-phase switching logic coupled to an output of the comparator, the multi-phase switching logic to assert a second output in response to both detecting the first output and receiving a signal indicative of a phase switch of the sinusoidal wave generator, wherein the second output is to control timing of applying a multi-phase switching pattern to sets of switches.

16. The system of claim 15, wherein, to control the timing, the second output is to cause a change in the multi-phase switching pattern applied to the sets of switches.

17. The system of claim 15, further comprising:
a transmission pattern control register to apply, responsive to receipt of the second output, the multi-phase switching pattern to sets of switches; and
a transmission pattern register coupled to the transmission pattern control register, the transmission pattern register to buffer a pre-loaded transmission pattern and transfer the pre-loaded transmission pattern to the transmission pattern control register in response to the second output.

18. The system of claim 15, further comprising processing logic coupled to the multi-phase switching logic, the processing logic to supply the signal, to the multi-phase switching logic, indicative of timing of the phase switch between excitation frames of the sinusoidal wave generator.

19. The system of claim 15, further comprising a timer table controller coupled between the sinusoidal wave generator and the multi-phase switching logic, the timer table controller to assert the signal, to the multi-phase switching logic, indicative of the phase switch detected between excitation frames of sinusoidal wave generator.

20. The system of claim 15, further comprising:
a first TX buffer coupled to a first TX electrode of the plurality of TX electrodes;
a first set of switches coupled to the first TX buffer;
a second TX buffer coupled to a second TX electrode of the plurality of TX electrodes; and
a second set of switches coupled to the second TX buffer; and
wherein each of the first set of switches and the second set of switches are included in the sets of switches that are switched according to the multi-phase switching pattern.

* * * * *